July 17, 1956 C. ROSE ET AL 2,754,537
HINGE STRUCTURE
Filed March 19, 1953 2 Sheets-Sheet 1

INVENTORS.
CARL ROSE
GUSTAF W. WINQUIST
BY George Sipkin
ATTORNEYS

July 17, 1956  C. ROSE ET AL  2,754,537
HINGE STRUCTURE
Filed March 19, 1953  2 Sheets-Sheet 2
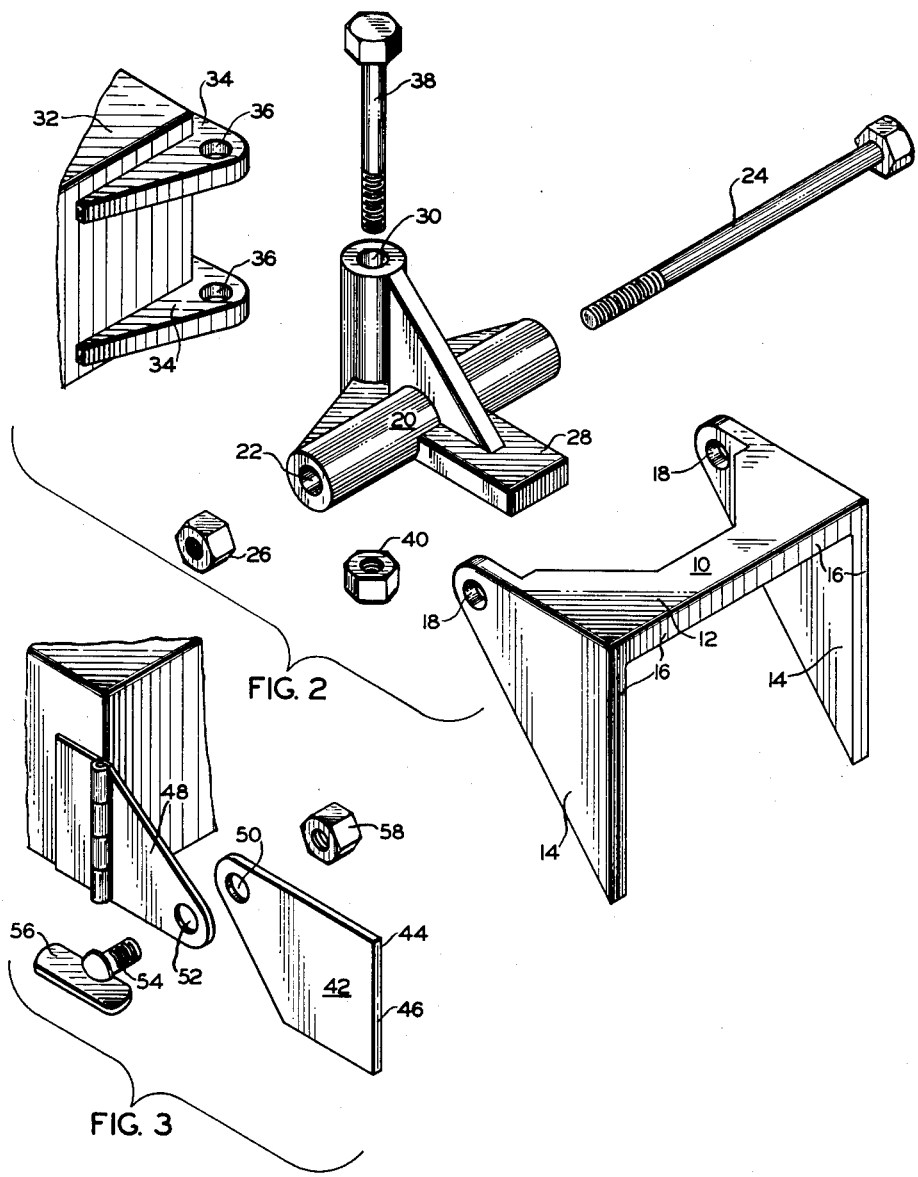
INVENTORS.
CARL ROSE
GUSTAF W. WINQUIST
BY George Sipkin
H. Heintgen
ATTORNEYS

United States Patent Office 2,754,537
Patented July 17, 1956

2,754,537
HINGE STRUCTURE

Carl Rose, Philadelphia, and Gustaf W. Winquist, Upper Darby, Pa., assignors to the United States of America as represented by the Secretary of the Navy Application March 19, 1953, Serial No. 343,534

2 Claims. (Cl. 16—163)

(Granted under Title 35, U. S. Code (1952), sec. 266)

The invention described herein may be manufactured and used by or for the Government of the United States of America for governmental purposes without the payment of any royalties thereon or therefor.

In cramped quarters such as found in combat vessels it is desirable to have a platform which is usable as a table top when in the horizontal position and which may be folded flat against a wall when not in use. It is also desirable for such a table top to be movable in a horizontal plane so that it may be moved into a writing position with respect to an immovable seat.

It is accordingly an object of this invention to provide a mechanism which supports a table top in a horizontal position and also permits the table top to be moved out of the way without completely disengaging the table top from its supports.

It is a further object of the invention to provide a mechanism of the type described which allows limited movement of a table top in two directions.

Other objects and many of the attendant advantages of this invention will be readily appreciated as the same becomes better understood by reference to the following detailed description when considered in connection with the accompanying drawings wherein:

Fig. 2 is an exploded view of a portion of the supporting mechanism; and

Fig. 3 is an exploded view of another portion of the supporting mechanism.

Figure 1:
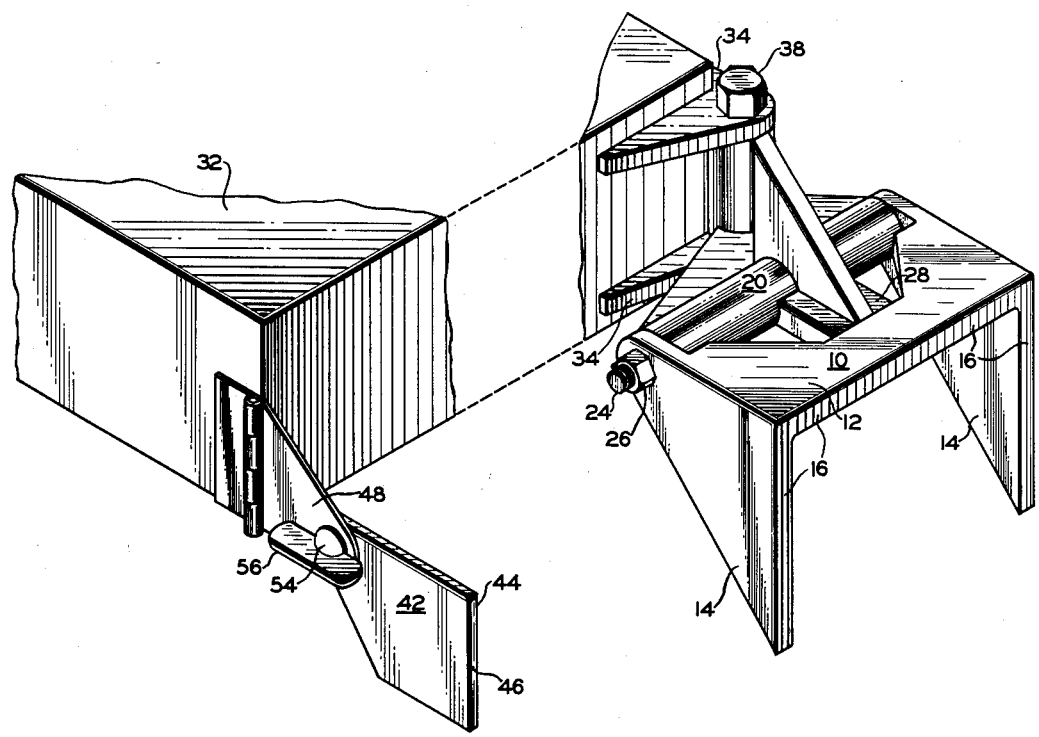
Fig. 1 is a view of the table supporting mechanism of this invention which shows a table top being supported in a horizontal position.

Referring now the drawings for a detailed description of the invention, the reference numeral 10 designates a generally U-shaped supporting bracket having an upper horizontal plate 12 and two downwardly extending legs 14. The bracket 10 has vertical rear edge portions 16 which are adapted to be welded to a vertical metal wall of a ship. Each of the legs 14 has an opening 18 therein.

An intermediate hinge member 20 has a horizontal bearing socket 22 and is secured to the bracket 10 by means of pivot bolt or pintle 24 which passes through the openings 18 and the bearing socket 22. The bolt 24 is retained in place by a nut 26. The hinge member 20 has a stop 28 which engages the undersurface of the horizontal plate 12 to limit the horizontal pivotal movement of the member 20 and the member 20 is additionally provided with a bearing socket 30 which is normal or perpendicular to the bearing socket 22.

A rectangular metal platform such as a table top 32 has two spaced-apart angle fastening members 34 welded across one of its corners. Each of the fastening members 34 is provided with an aperture 36 to receive a pivot bolt 38 to provide a vertical pivot for the table top.

It will be apparent from the foregoing that when the bracket 10 is secured to a wall, the table top 32 may be pivoted upwardly about the horizontal pivot to a position flat against the wall or pivoted on a vertical axis.

A second hinge arrangement 42 is provided at an adjacent edge of the table top 32, and comprises a supporting plate 44 which has a vertical edge 46 adapted to be welded to the wall. A plate 48 is hinged vertically to a corner of the table top 32 and horizontally by apertures 50 and 52 in the respective plates and a pivot pin 54. A tool 56 can be used to fasten the pin 54 and nut 58.

It will be apparent from the above that the supporting mechanism of this invention provides for supporting a table top to swing through at least 90° in a horizontal plane when so desired and also provides for folding the table top against the supporting wall.

Obviously many modifications and variations of the present invention are possible in the light of the above teachings. It is therefore to be understood that within the scope of the appended claims the invention may be practiced otherwise than as specifically described.

What is claimed is:

1. A hinge assembly for the vertical and horizontal adjustment of a table top which comprises a hinge member having structure forming a horizontal socket and spaced therefrom an integral vertical socket, a vertical bracket having apertured upper and lower arms extending laterally from a table top, said vertical socket being disposed between said arms and pintle means interconnecting the arms and the vertical socket permitting horizontal movement of the table top, a horizontal bracket having spaced apertured side portions and an interconnecting web portion, said horizontal socket being disposed between said side portions of the horizontal bracket and pintle means interconnecting the side portions and the horizontal socket, a lug extending from the horizontal socket and disposed beneath the web portion of the horizontal bracket to permit limited vertical movement of a table top when the horizontal bracket is secured to a vertical wall.

2. A hinge which comprises a first socket, longitudinal plate members extending transversely from said first socket in opposed directions, a second socket carried by one of said plate members and positioned normal to the first socket, a bracket having spaced apertured side portions and an interconnecting web portion, said first socket being disposed between said side portions, pintle means interconnecting said apertured side portions and said first socket and positioning said second plate member beneath said web portion of the bracket to limit the relative movement between the hinge and the bracket.

References Cited in the file of this patent

UNITED STATES PATENTS

| 180,740 | Alvord | Aug. 8, 1876 |
| 488,509 | Sweeney | Dec. 20, 1892 |
| 582,480 | McKay | May 11, 1897 |
| 734,702 | Hale | July 28, 1903 |
| 1,061,678 | Lapacek | May 13, 1913 |
| 1,215,593 | Voss | Feb. 13, 1917 |
| 1,887,549 | Ervin | Nov. 15, 1932 |
| 2,003,008 | Perl | May 28, 1935 |
| 2,067,559 | Bloom | Jan. 12, 1937 |

FOREIGN PATENTS

| 3,306 | Great Britain | 1897 |
| 270,422 | Great Britain | May 9, 1927 |
| 505,431 | Great Britain | May 8, 1939 |